(12) United States Patent
Dillon

(10) Patent No.: US 9,897,229 B2
(45) Date of Patent: Feb. 20, 2018

(54) DRAIN VALVE AND METHOD

(71) Applicant: Kevin Dillon, West Sand Lake, NY (US)

(72) Inventor: Kevin Dillon, West Sand Lake, NY (US)

( * ) Notice: Subject to any disclaimer, the term of this patent is extended or adjusted under 35 U.S.C. 154(b) by 0 days.

(21) Appl. No.: 15/150,450

(22) Filed: May 10, 2016

(65) Prior Publication Data

US 2016/0252191 A1  Sep. 1, 2016

Related U.S. Application Data

(63) Continuation-in-part of application No. 14/513,593, filed on Oct. 14, 2014, now Pat. No. 9,334,979.

(51) Int. Cl.

| | |
|---|---|
| *F16K 5/06* | (2006.01) |
| *F16K 31/524* | (2006.01) |
| *F16K 35/00* | (2006.01) |
| *F16K 27/06* | (2006.01) |
| *F16K 11/087* | (2006.01) |
| *F01M 11/04* | (2006.01) |
| *F16K 24/04* | (2006.01) |

(52) U.S. Cl.
CPC ....... *F16K 31/52458* (2013.01); *F01M 11/04* (2013.01); *F01M 11/0408* (2013.01); *F16K 5/06* (2013.01); *F16K 5/0647* (2013.01); *F16K 11/0876* (2013.01); *F16K 24/04* (2013.01); *F16K 27/067* (2013.01); *F16K 35/00* (2013.01); *F01M 2011/0416* (2013.01); *F01M 2011/0425* (2013.01)

(58) Field of Classification Search
CPC .. F16K 31/52458; F16K 5/0647; F16K 24/04; F16K 5/06; F16K 35/00; F16K 27/067; F16K 11/0876; F01M 11/04; F01M 11/0408; F01M 2011/0425
USPC ...... 251/288, 340, 297, 315.01–315.16, 144; 184/1.5

See application file for complete search history.

(56) References Cited

U.S. PATENT DOCUMENTS

| | | | | |
|---|---|---|---|---|
| 133,215 | A | * | 11/1872 | Endicott ........... F16K 31/52408 251/315.01 |
| 3,269,692 | A | * | 8/1966 | Shafer .................. F16K 5/0673 251/315.05 |
| 3,677,369 | A | * | 7/1972 | Schramm ................ F16L 55/00 184/1.5 |

(Continued)

FOREIGN PATENT DOCUMENTS

KR       100370785 A       5/2002

*Primary Examiner* — John Bastianelli
(74) *Attorney, Agent, or Firm* — Schmeiser, Olsen & Watts, LLP

(57) ABSTRACT

A drain valve that includes a body having an upper opening. The drain valve further includes a valve located in the body having a valve opening that is alignable with the upper opening when the valve is in an open state. The valve is configured to release oil that enters the valve through the upper opening when the valve is in an open state. The valve is rotatable about the body in a first rotational direction to move the valve from the open state to a closed state. The valve is rotatable about the body in a second rotational direction opposite from the first rotational direction to move the valve from the closed state to the open state. A method of draining fluid from a system.

14 Claims, 16 Drawing Sheets

(56) References Cited

U.S. PATENT DOCUMENTS

| | | | | |
|---|---|---|---|---|
| 3,703,250 | A | * | 11/1972 | Middleton .............. F16L 55/10 |
| | | | | 222/507 |
| 3,954,250 | A | * | 5/1976 | Grace ................ F01M 11/0408 |
| | | | | 184/1.5 |
| 4,025,048 | A | | 5/1977 | Tibbitts |
| 4,745,894 | A | | 5/1988 | Laipply et al. |
| 4,807,847 | A | | 2/1989 | Martz |
| 5,076,542 | A | * | 12/1991 | Ottens ................... F16K 27/067 |
| | | | | 251/367 |
| 5,086,522 | A | | 2/1992 | Stofko, Sr. |
| 5,368,181 | A | | 11/1994 | Myers |
| 5,407,177 | A | * | 4/1995 | Lombardo ............ F16K 5/0647 |
| | | | | 251/315.14 |
| 5,411,115 | A | | 5/1995 | Shropshire |
| 5,431,588 | A | * | 7/1995 | Kucik .................... B01D 27/08 |
| | | | | 210/DIG. 17 |
| 6,609,699 | B2 | | 5/2003 | Chen |
| 7,165,568 | B2 | * | 1/2007 | Kessell .............. A47G 19/2266 |
| | | | | 251/317.01 |
| 9,334,979 | B2 | | 5/2016 | Dillon |
| 2003/0160203 | A1 | * | 8/2003 | Chen ................. F01M 11/0408 |
| | | | | 251/293 |
| 2008/0099080 | A1 | | 5/2008 | Saini et al. |

* cited by examiner

DRAIN VALVE AND METHOD

CROSS-REFERENCE TO RELATED APPLICATION

This application is a continuation-in-part patent application of U.S. application Ser. No. 14/513,593 filed on Oct. 14, 2014, the entire contents of which are hereby incorporated by reference for which priority is claimed under 35 U.S.C. § 120.

FIELD OF TECHNOLOGY

The subject matter disclosed herein relates generally to drain valves. More particularly, the subject matter relates to an oil (or other fluid) drain valve that provides for ease of opening and closing to allow oil or other fluid to drain therefrom.

BACKGROUND

Oil drain valves for installation on tractor trailers and other motorized vehicles must typically be removed or opened in order to allow oil to be released from a crankcase or oil pan during an oil change. Prior art oil drain valves can be difficult to open and often require additional tools for doing so. Newer oil drain valves have been created which include levers for opening and closing the valve by hand. These levers are easy to actuate in order to change the oil drain valve from a closed state to an open state and vice versa. However, these levers are also exposed to the environment below the vehicle during driving conditions. It has been found that these levers can be hit by debris or other objects when a vehicle is driving down the road. Sometimes, contact made by debris will accidentally actuate the lever and open the oil drain valve, creating an oil leak in the vehicle. An oil leak that occurs while driving in this manner can be dangerous to the environment, and may even damage the vehicle if the leak is not discovered very quickly by an alert driver.

Thus, an oil drain valve that provides for ease of opening and closing that does not include an exposed lever would be well received in the art.

BRIEF DESCRIPTION

According to one embodiment, a drain valve comprises: a body having an upper opening; a valve located in the body having a valve opening that is alignable with the upper opening when the valve is in an open state, the valve configured to release fluid that enters the valve through the upper opening when the valve is in an open state; wherein the valve is rotatable about the body in a first rotational direction to move the valve from the open state to a closed state, and wherein the valve is rotatable about the body in a second rotational direction opposite from the first rotational direction to move the valve from the closed state to the open state.

According to another embodiment, a drain valve comprising: a body; a valve having a first valve opening that is exposed to an external environment through a body, the valve including a drain opening for releasing fluid through a second valve opening; wherein the body is rotatable about the valve in a first rotational direction to move the valve from the open state to a closed state with respect to the body.

According to another embodiment, a method of draining fluid from a system comprises: providing a drain valve having a body and a valve; rotating the valve about the body in a first direction to open the drain valve; accepting receiving fluid through the opened drain valve; releasing the fluid through a conduit at a bottom of the drain valve; and rotating the valve about the body in a second direction to close the drain valve.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
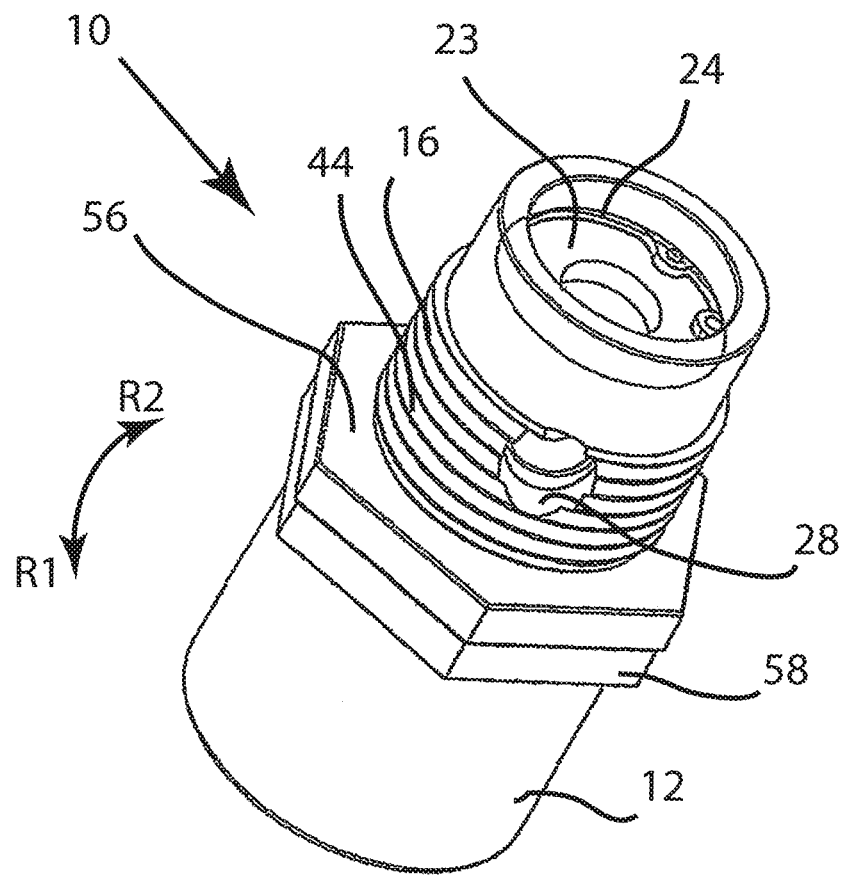
FIG. 1 depicts a perspective view of an oil drain valve in accordance with one embodiment.
Figure 2:
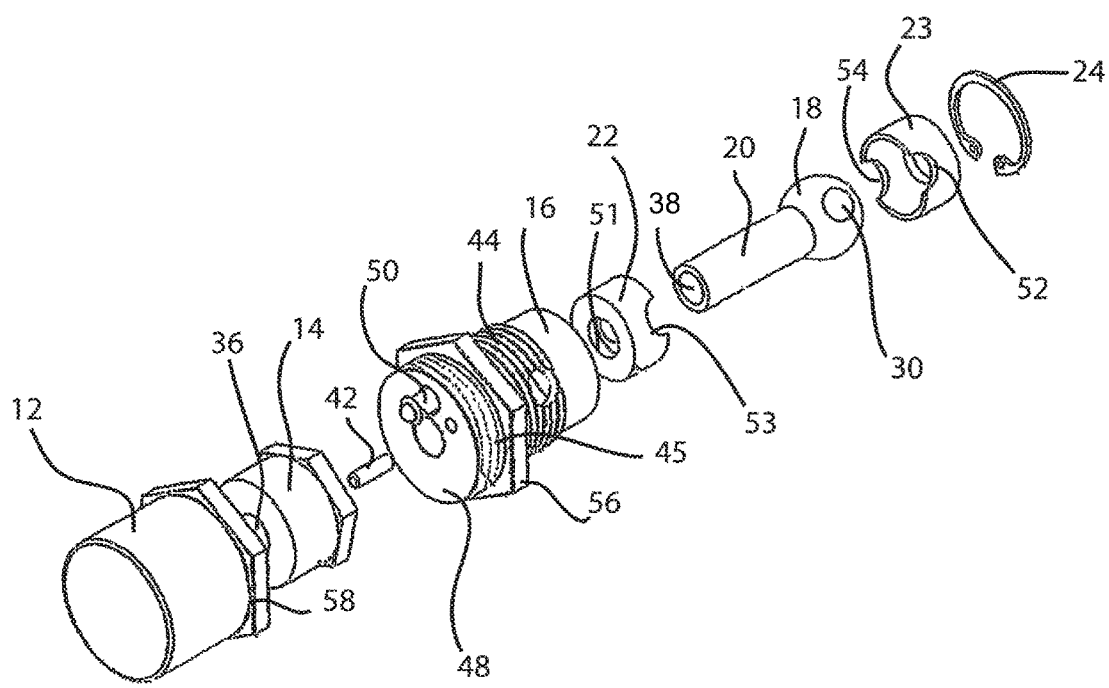
FIG. 2 depicts an exploded view of the oil drain valve of FIG. 1 in accordance with one embodiment.
Figure 3:
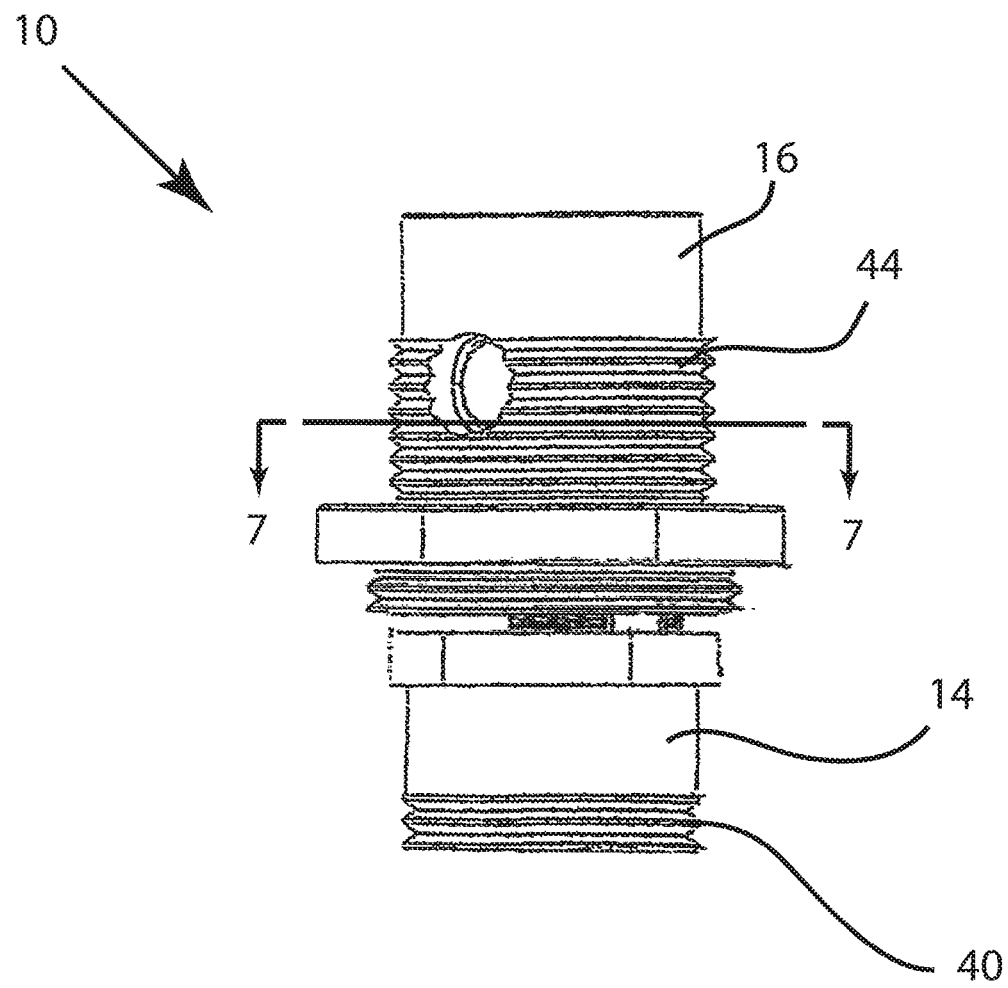
FIG. 3 depicts a side view of the oil drain valve of FIGS. 1 and 2 without a protective cap in accordance with one embodiment.
Figure 4:
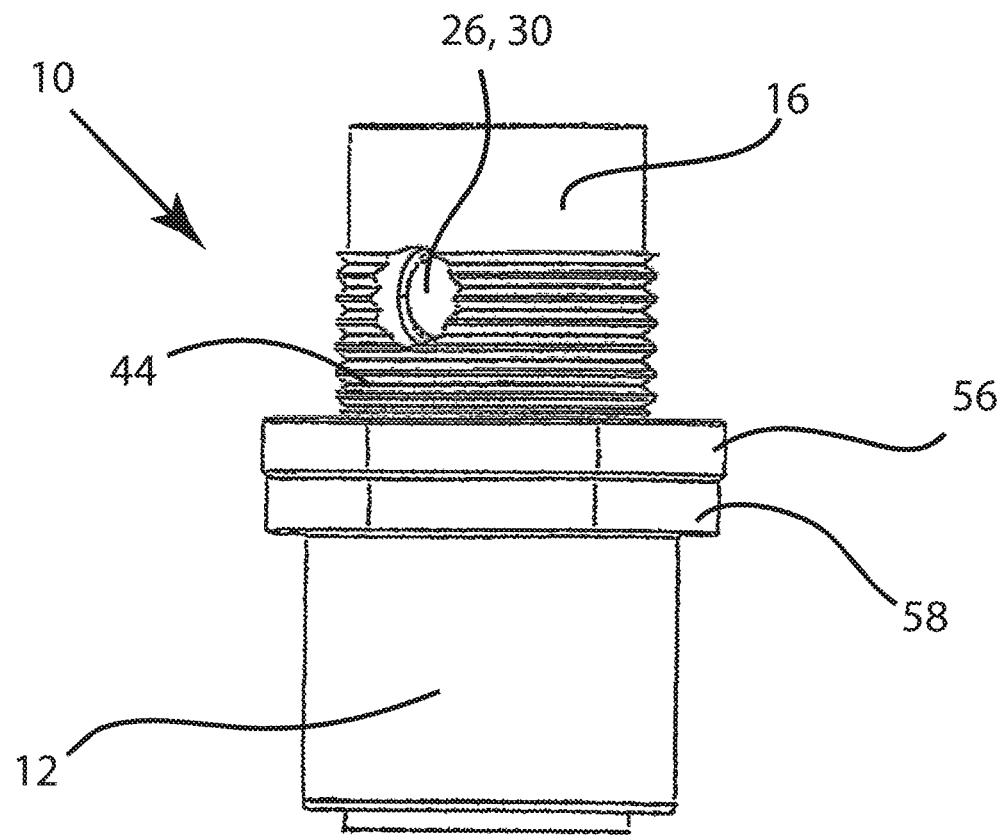
FIG. 4 depicts a side view of the oil drain valve of FIGS. 1-3 with the protective cap in accordance with one embodiment.

A detailed description of the hereinafter described embodiments of the disclosed apparatus and method are presented herein by way of exemplification and not limitation with reference to the Figures.

Referring to FIGS. 1-5, an oil drain valve 10 is shown in various views. The oil drain valve 10 includes a protective cap 12, a lower body 14, an upper body 16, a ball valve 18 connected to a conduit 20, a lower bushing 22, an upper bushing 23, and a snap ring 24. The upper body 16 includes two upper body openings 26, 28 which are alignable with two valve openings 30, 32 in the ball valve 18 when the ball valve 18 is in an open state. The ball valve 18 further includes a drain opening 34 connected to the conduit 20 for releasing oil into and/or out of the lower body 14 through a lower body drainage opening 36. The ball valve 18 may be, for example, a three hole steel ball valve that includes the two horizontal openings 30, 32 and the one downward vertical opening 36. The upper body 16 may be attachable to an oil pan (not shown) such that the two upper body 16 and the upper body openings 26, 28 extend into the oil pan and are exposed to oil within the bottom of the oil pan.

Figure 5:
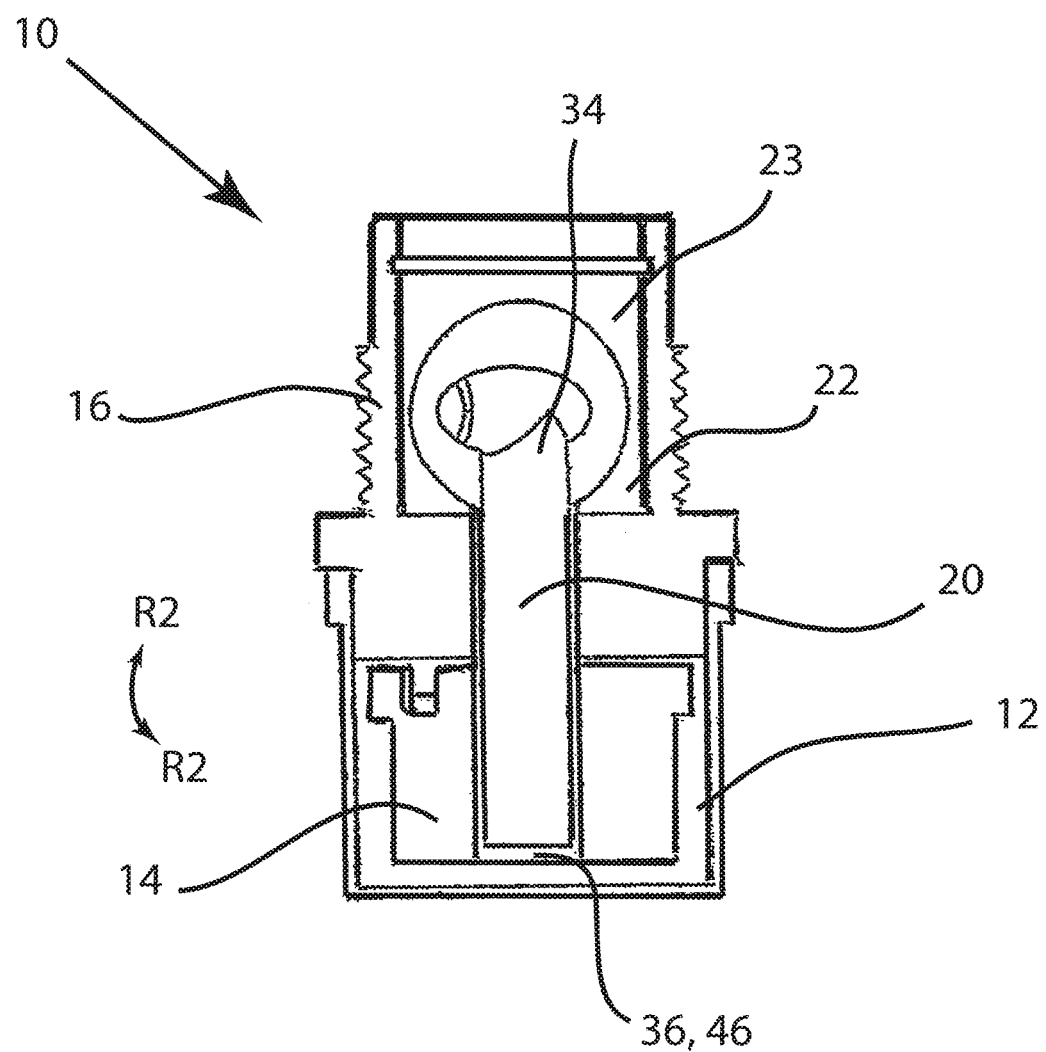
FIG. 5 depicts a cross sectional view of the oil drain valve of FIGS. 1-4 in an open state in accordance with one embodiment.
Figure 6:
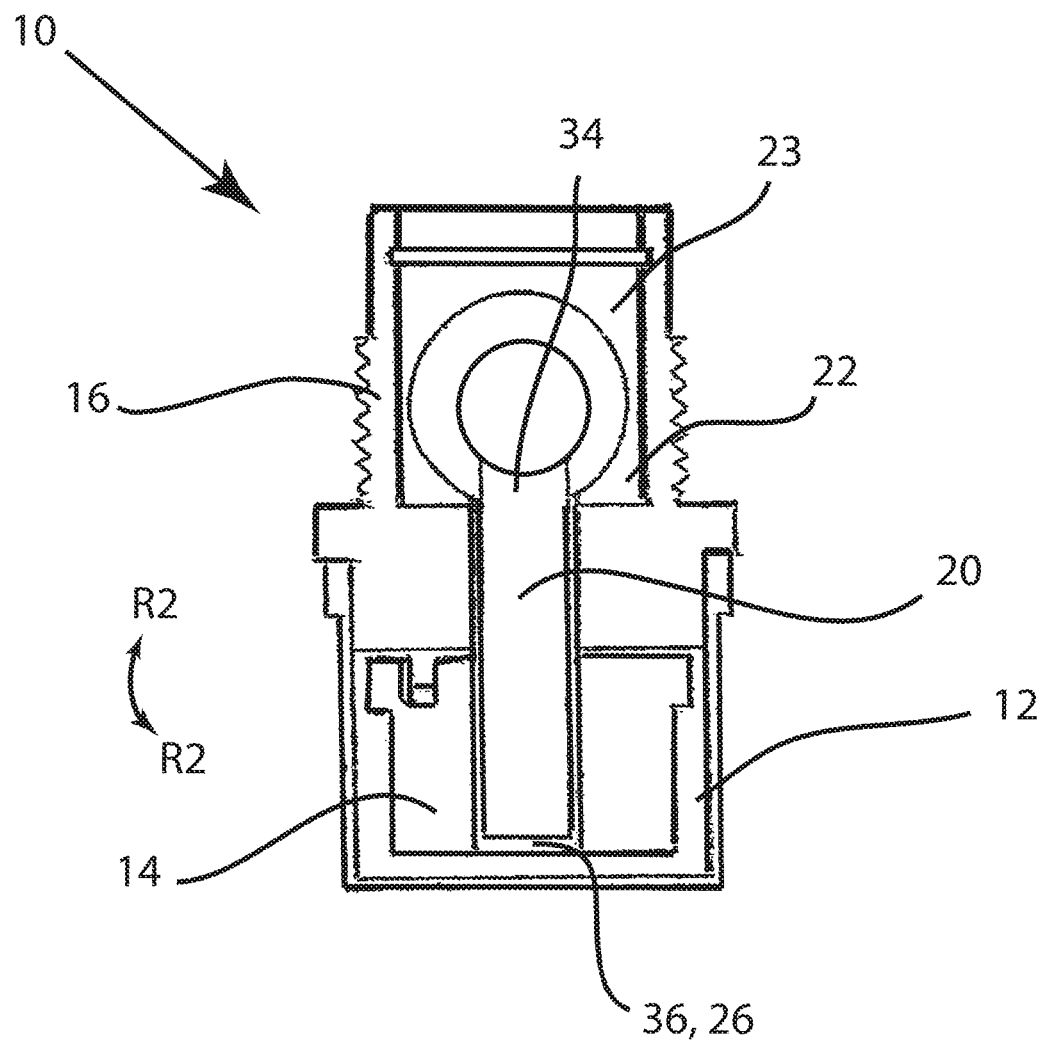
FIG. 6 depicts a cross sectional view of the oil drain valve of FIGS. 1-5 in a closed state in accordance with one embodiment.
Figure 7:
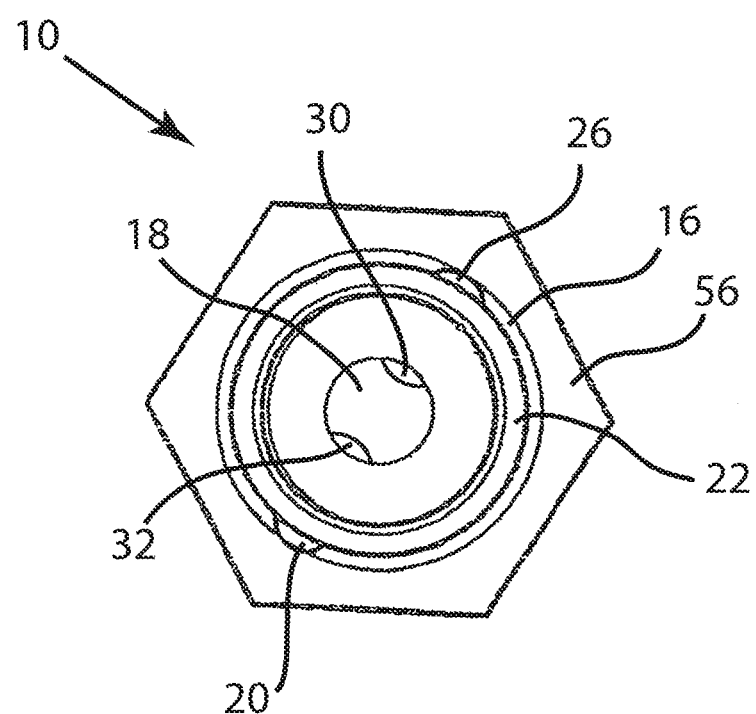
FIG. 7 depicts a top cutaway view of the oil drain valve of FIGS. 1-6 taken at arrows 7-7 in accordance with one embodiment.

The lower body 14 may be rotatable about the upper body 16 in a first rotational direction R1 to move the ball valve 18 from the open state, as shown in FIG. 5, to a closed state, as shown in FIG. 6. The lower body 14 may be rotatable about the upper body 16 in a second rotational direction R2 opposite from the first rotational direction R1 to move the ball valve 18 from the closed state to the open state. In the open state, the oil from the oil pan is configured to enter into the oil drain valve 10 through the upper body openings 26, 28, and proceed to flow into the ball valve 18 through the valve openings 30, 32. From there, the oil drains out the drain opening 34 of the ball valve 18 and into the conduit 20. From there, the oil exits the oil drain valve from a conduit opening 38 at the bottom of the conduit 20 and the lower body drainage opening 36. The oil may continue to flow out of the oil pan in this manner until the lower body 14 is rotated in the first rotational direction R1 to close the oil drain valve 10.

The lower body 14 and the upper body 16 may be casings which are vertically connected to one another, respectively, by the conduit 20. The conduit 20 may be connected, via a permanent press, for example, to the ball valve 18 such that the bottom opening (not shown) of the ball valve 18 is aligned with the conduit 20. It should be understood that the conduit 20 could be referred to as a drain tube, channel, opening, tube, or the like. The upper body 16 may include a cup-like shape. With the two openings 26, 28 in the side of the cup-like shape, and an opening in the bottom of the cup-like shape (not shown) which allows the conduit 20, after being attached to the ball valve 18, to extend therethrough. The upper body 16 may be internally machined to accept the ball valve 18. Thus, to assemble the oil drain valve 10, the conduit 20 may be fit through the bottom opening of the upper body 16 to extend through and into the lower body drainage opening 36 of the lower body 14. The conduit 20 may be permanently pressed into the lower body drainage opening 36 creating an internal drain.

The two upper body openings 26, 28 may be disposed on opposite sides of the upper body 16. The valve openings 30, 32 may be similarly located on opposite sides of the ball valve 18. The valve openings 30, 32 may be alignable with the two upper body openings 26, 28 when the ball valve 18 is in an open state, as shown in FIG. 5. In other embodiment, the upper body 16 and the ball valve 18 may each include a single opening, rather than the two 26, 28, 30, 32 each as shown. Alternately, three or more openings are contemplated. The additional openings in the ball valve 18 may be configured to allow more oil to flow through the valve more quickly. Alternately, the size of the openings can be increased or decreased to accommodate faster or slower oil flow depending on the desired flow rate. Whatever the embodiment, the outer circumference of the ball valve 18 in the plane of the openings 30, 32 must include an equal or greater percentage of the perimeter as a solid outer wall without an opening. This ensures that the ball valve 18 may enter a fully closed state when rotated into the closed position as shown in FIG. 6.

In order to provide for the rotation of the ball valve 18 with respect to the upper body 16 when the lower body 14 is rotated, the ball valve 18 may be operably connected to the lower body 14. In the embodiment shown, the conduit 20 extending from the bottom of the ball valve 18 may be connected to the lower body 14. Thus, the lower body 14 may be bored to include a center opening, hole, bore or channel 46 that extends axially along its entire length within the center of the lower body 14. Thus, the channel 46 may extend fully through the axial length of the lower body 14. The channel 46 may include a circular cross section. The channel 46 may extend from the lower body drainage opening 36 to the top of the lower body 14 proximate the ball valve 18. The conduit 20 attached to the ball valve 18 may also be attached to this channel 46. In one embodiment, the conduit 20 may be welded within the center opening 46 of the lower body 14. Whatever the attachment mechanism, when the lower body 14 is rotated, it automatically exacts rotation on the ball valve 18.

In another embodiment, the conduit 20 may not be included at all and instead the ball valve 18 may simply be directly attached to the top of the lower body 14. Thus, the ball valve 18 may expel oil from the drain opening 34 and into the channel 46 of the lower body 14. This channel 46 may thus replace the conduit 20. Whatever the embodiment, when the lower body 14 is rotated with respect to the upper body 16, the ball valve 18 may be configured to rotate. This may provide for the opening and closing of the openings 26, 28, 30, 32 of the upper body 16 and the ball valve 18, respectively. Moreover, the size of the conduit 20 and/or channel 46 may be expanded or decreased with respect to the embodiment shown to allow oil to drain more or less quickly.

The lower bushing 22 and the upper bushing 23 may surround the ball valve 18 within the upper body 16. The lower bushing 22 and the upper bushing 23 may, for example, be made from nylon or plastic. Other materials, such as metal, steel or the like, are contemplated. The lower bushing 22 and the upper bushing 23 may be configured to tightly surround the ball valve 18 and prevent fluid from escaping from the ball valve 18 other than through the openings 30, 32 and the drain opening 34. As explained hereinabove, the upper body 16 may not be enclosed at the top at a location above where the ball valve 18 resides. To fashion the ball valve 18 within the upper body 16, the upper body 16 may include the cup-like cavity which is larger than the ball valve 18. Prior to placing the ball valve 18 and conduit 20 into the upper body 16, the lower bushing 22 may first be placed into the cup-like opening of the upper body 16 with two horizontal openings 51, 53 aligned with the openings 26, 28 of the upper body. The upper bushing 23 may act as a cap of the upper body 16 having two horizontal openings 52, 54 aligned with the openings 26, 28 of the upper body 16. It should be understood that the openings 51-54 may be milled into the bushings 22, 23. In this embodiment, the upper bushing 23 may actually be threadably engageable with internal threads (not shown) the upper body 16. In other embodiments, the upper bushing 23 may be press fit into the upper body 16. In this manner, the upper bushing 23 cap may be attached to the top of the upper body 16 after the ball valve 18 has been inserted therein. In other embodiments, no bushings 22, 23 may be used. Instead, the upper body 16 may tightly surround the ball valve 18 on both the upper and lower halves of the ball valve 18. In the embodiment shown, the snap ring 24 may be placed above the upper bushing 23 within the cup-like opening of the upper body 16 to further retain the upper bushing 23 within the upper body 16.

In yet other embodiments, a single bushing may be used rather than the two bushing 22, 23. For example, the oil drain valve 10 may include the lower bushing 22 but not the upper bushing 23. In this embodiment, the upper portion of an inner cavity of the upper body 16 may be curved in the shape of the ball valve 18 to tightly surround the upper half of the ball valve 18, while the lower half of the ball valve 18 may be tightly surrounded by a lower bushing 22 that is fit into the upper body 16. In this embodiment, the assembly of the oil drain valve 10 may include providing the upper body 16, placing the ball valve 18 into the cavity of the upper body 16 with the conduit 20 extending out of the bottom of the upper body 16. Next, the lower bushing 22 may be placed into the conduit 20. This assembly may be held into place when the lower body 14 is attached to the upper body 16 by the press fitting of the conduit 20 with the lower body drainage opening 36 of the lower body 14.

A user may replace a standard oil drain with the oil drain 10. Alternatively, the oil drain valve 10 may come standard in a vehicle. Once the upper body 16 is attached to the oil pan, a user may rotate the lower body 14 while the upper body 16 remains stationary and attached to the oil pan. Rotating the lower body 14 with respect to the upper body 16 in this manner may open the ball valve 18 and allow oil to drain through the valve 10 from the openings 26, 28, 30, 32 in the oil pan and out of the bottom of the valve 10. The lower body 14 may have a threaded outer wall 40. The threaded outer wall 40 may be dimensioned to receive a standard garden hose (not shown). The garden hose may be attachable to the lower body 14 to allow a user to drain oil from the oil pan and into a bucket more conveniently, rather than require a bucket to be placed directly under the oil drain valve 10.

The protective cap 12 may be configured to cover the lower body drainage opening 36 in the lower body 14. This protective cap 12 may be screwed into the lower body 14 after the oil drain valve 10 is used to drain oil. The upper body may include external lower threads 45 which may threadably engage with internal female threads (not shown) found in the protective cap 12. In other embodiments, the protective cap 12 may slide onto the lower body 14 via an interference fit. The protective cap 12 may replace a garden hose, for example, after use. This protective cap 12 may protect from unwanted drainage just in case the lower body 14 is rotated with respect to the upper body 16 in an unintentional manner. Moreover, the protective cap 12 may be magnetic so that it is easily attachable to metallic components to prevent it from becoming lost when a user is using the oil drain valve 10 to drain oil.

Similar to the lower body 14, the upper body 16 may also include a threaded outer wall 44 that is configured to be screwed into an oil pan of a vehicle (not shown). As described hereinabove, at least a portion of the upper body openings 26, 28 are exposed in the oil pan when the oil drain valve 10 is screwed into the oil pan. In one embodiment, the entirety of the openings 26, 28 may be found within the oil pan when the outer wall 44 is screwed fully into the bottom of the oil pan of a vehicle.

The oil drain valve 10 may further include a limiting pin 42. The limiting pin 42 may be located within the upper and lower bodies 14, 16 and may be configured to prevent rotation of the lower body 14 about the upper body 16 beyond a predetermined amount of rotation. In one embodiment, the limiting pin 42 may prevent the rotation of the lower body 14 about the upper body 16 in the first rotational direction R1. In another embodiment, the limiting pin 42 may prevent the rotation of the lower body about the upper body 16 in the second rotational direction R2. Whatever direction the limiting pin 42 prevents rotation of the lower body 14 about the upper body 16, the opposite direction may be prevented from rotation beyond a second set point. This second limit may be provided by the tightening of the threads of the upper body 16 an lower body 14 until a hexagonal outer circumference 58 of the lower body 14 and a hexagonal outer circumference 56 of the upper body 16. The limiting pin 42 may be affixed, in one embodiment, to a bottom surface 48 of the upper body 16. The limiting pin 42 may be configured to ride within a milled guide (not shown) cut into an upper surface of the lower body 14. In one embodiment, the limiting pin 42 may be configured to restrict movement of the lower body 14 with respect to the upper body 16 to a quarter turn. In another embodiment, the milled surface of the lower body 14 may prevent more or less rotation. Whatever the embodiment, this rotation may open and close the openings 26, 28, 30, 32 of the ball valve 18 and the upper body 16.

The lower body 14 and upper body 16 may releasably lock together when the ball valve 18 is in the closed state, as shown in FIG. 6. The closed state may require additional force to release the lower body 14 from the upper body 16 relative to the force required to rotate the lower body 14 about the upper body 16 once released from the closed state. In one embodiment, the lower body 14 may be held in position, when in the closed position, by a spring loaded ball check assembly 50 that may be press mounted, for example, into a pre drilled hole (note shown) in the bottom surface 48 of the upper body 16. The spring loaded ball check assembly 50 may aligned with the pre-drilled hole when the oil drain valve 10 is in a closed position and may be forced, by a spring, into the pre-drilled hole in this state. However, the rotational opening force on the lower body 14 with respect to the upper body 16 may dislodge the spring loaded ball check assembly 50 from the pre-drilled hole and allow for further rotation of the lower body 14 with respect to the upper body 16 to open the openings 26, 28, 30, 32 of the ball valve 18 and the upper body 16.

The upper body 16 may include a hexagonal outer circumference 56. The hexagonal outer circumference 56 may extend radially from the rest of the outer circumference of the upper body 16. The hexagonal outer circumference 56 may, in other embodiments, be circular, or shaped in other manners. However, the radial extension from the rest of the outer circumference of the outer body 16 may prevent the upper body 16 from being screwed into the bottom of the oil pan past the certain point. In other words, the hexagonal outer circumference 56 may act as a stop when attaching the oil drain valve 10 to the oil pan. Likewise, the lower body 14 may include a second hexagonal outer circumference 58. This may be used, in combination with the limiting pin 42, to prevent rotation of the lower body 14 about the upper body 16 past a certain point.

In yet another embodiment, a method is contemplated. The method may include draining oil from a vehicle (not shown). The method may first include providing an oil drain valve, such as the oil drain valve 10, having a housing, such as the lower body 14 and the upper body 16, and a ball valve, such as the ball valve 14. The method may include rotating the housing about the ball valve. The method may include opening the ball valve with respect to the housing, and accepting oil into the housing through the ball valve. The method may further include releasing oil from a conduit, such as the conduit 20, at a bottom of the oil drain valve.

Figure 8:
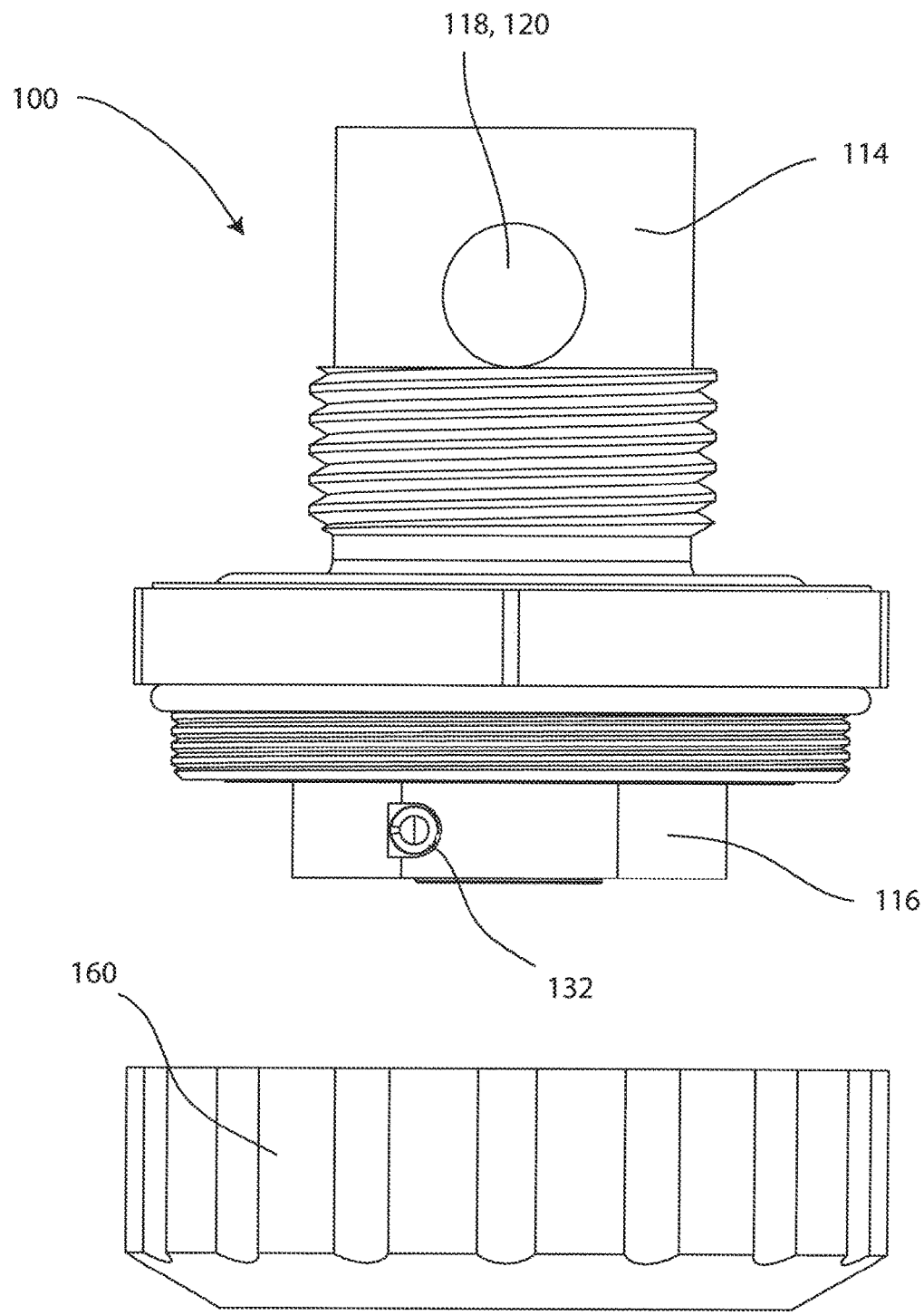
FIG. 8 depicts a side view of another oil drain valve in accordance with one embodiment.
Figure 9:
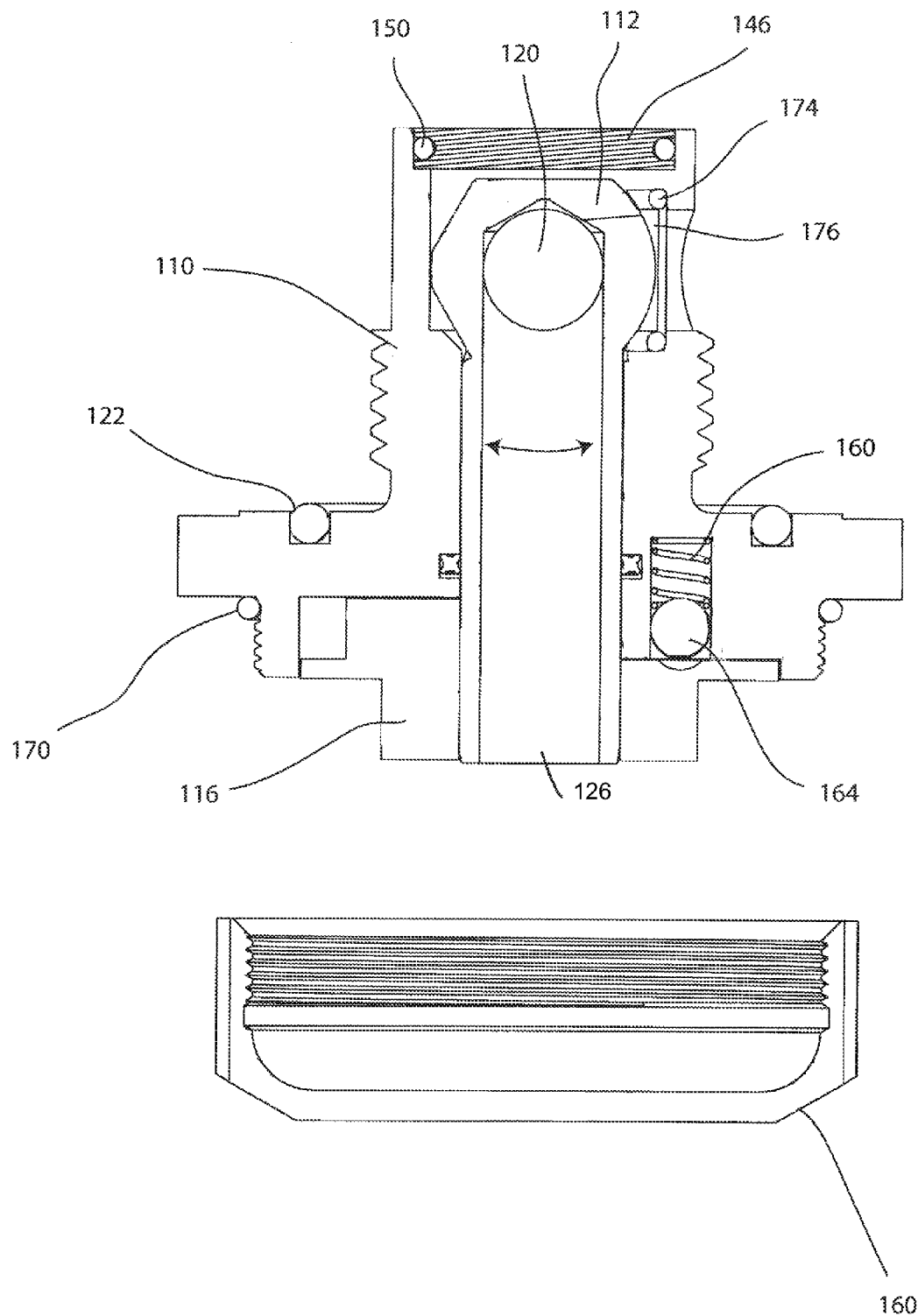
FIG. 9 depicts a side cutaway view of the oil drain valve of FIG. 8 in accordance with one embodiment.

Referring now to FIGS. 8-9, another embodiment of an oil drain valve 100 is shown. The oil drain valve 100 may have similar functionality to the oil drain valve 10 described hereinabove. It should be understood that the oil drain valve 100, like the oil drain valve 10, may be particularly configured for attachment to the oil pan of a vehicle (not shown). However, the valves 100, 10 may be utilized for other purposes in other fluid systems. For example, the valves 100, 10 may be used at the bottom of a boat to drain water from a bilge. Various other purposes are possible.

The oil drain valve 100 includes a body 110, and a valve 112 located within the body 110. The body 110 includes both an upper body 114 and an actuating component 116. The upper body 114 includes an upper opening 118. The valve 112 includes a valve opening 120 that is alignable with the upper opening 118 when the oil drain valve 100 is in an open state. The valve 112 may be configured to release oil or another liquid that enters the valve 112 through the upper opening 118 when the oil drain valve 100 is in an open state. The valve 112 may be rotatable about the body 110, and particularly the upper body 114, in a first rotational direction D1 to move the valve from the open state to a closed state. The valve 112 is further rotatable about the body 110, and particularly the upper body 114, in a second rotational direction D2 opposite from the first rotatable direction D1 to move the valve 112 from the closed state to the open state.

Figure 12:
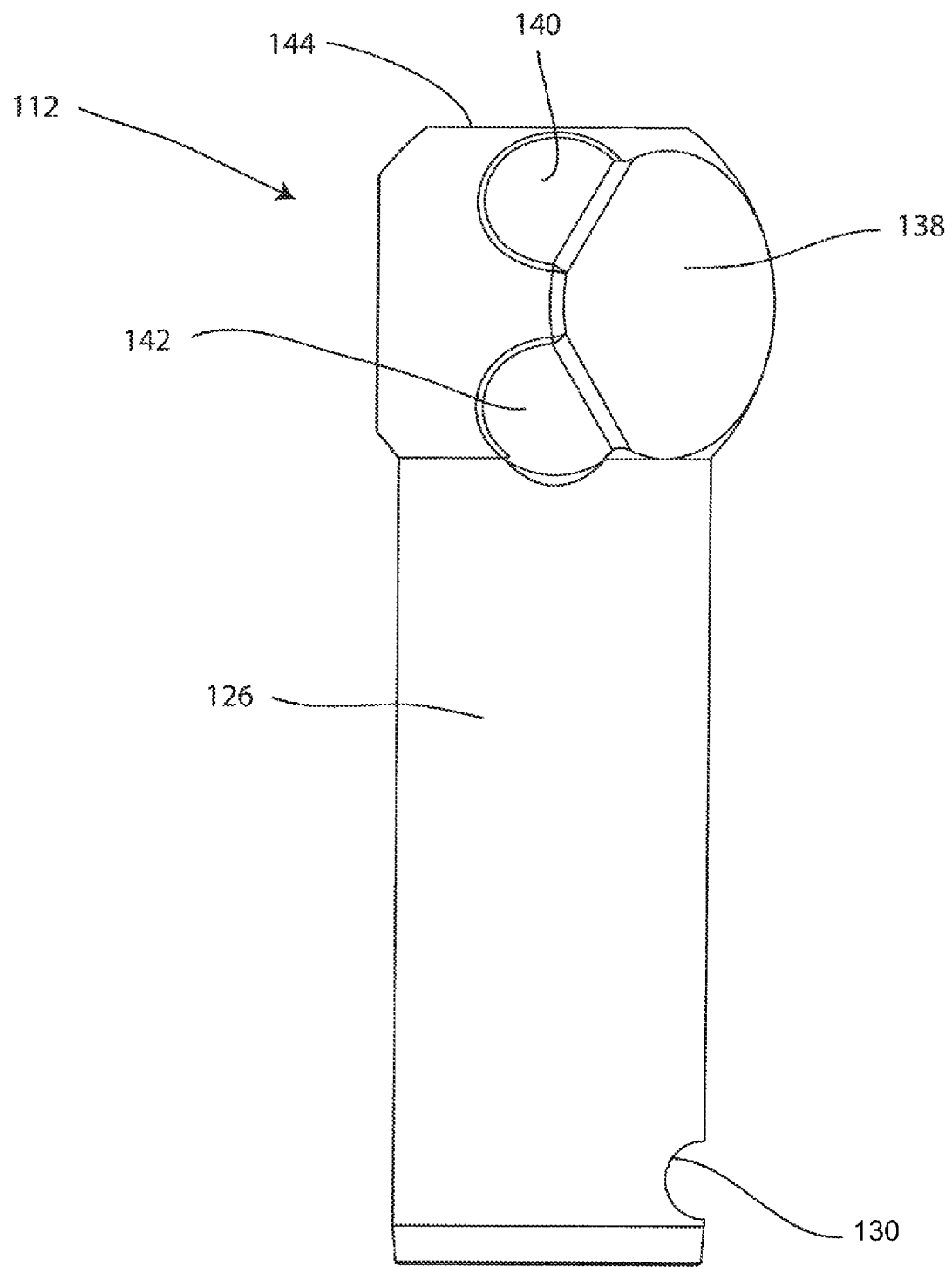
FIG. 12 depicts a front side view of a valve of the oil drain valve of FIGS. 8-9 in accordance with one embodiment.
Figure 13:
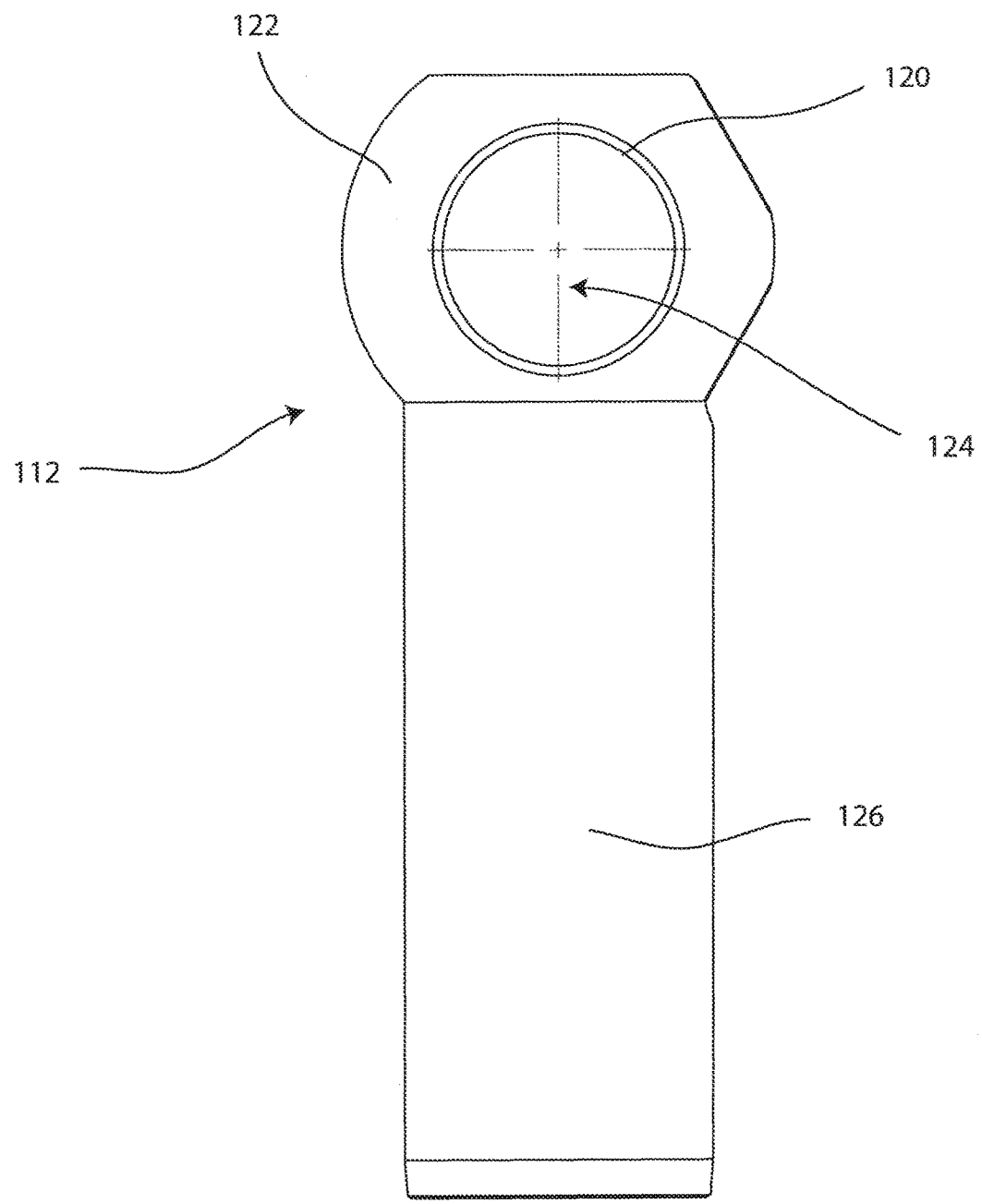
FIG. 13 depicts another side view of the valve of FIG. 12 in accordance with one embodiment.

The valve 112 is shown in the cross section of FIG. 9, along with the side views of FIGS. 12 and 13. The valve 112 may be a ball valve in one embodiment. The valve 112 includes an upper ball portion 122 that includes the valve opening 120. In other embodiments, the upper ball portion 122 may include more than one opening. The ball portion 122 of the valve 112 may include a ball chamber 124 connected to the valve opening 120. The ball chamber 124 may be connected to a conduit 126 extending vertically below the valve opening 120. The conduit 126 may include a lower opening 128. Thus, the oil or other fluid may enter the valve 112 through the opening 120 and into the ball chamber 124, and proceed through the conduit 126, and finally may exit the valve 112 through the lower opening 128.

In other embodiments the ball portion 122 and the conduit 126 may be two separate components, either attached or unattached, within the oil drain valve 100, as opposed to being a single integral component as shown. In still other embodiments, the conduit 126 may be an integral element of the upper body 114, rather than a separate component from the upper body 114. The conduit 126 may include a circumferential outer wall that extends from the ball portion 122 to the lower opening 128.

Figure 15:
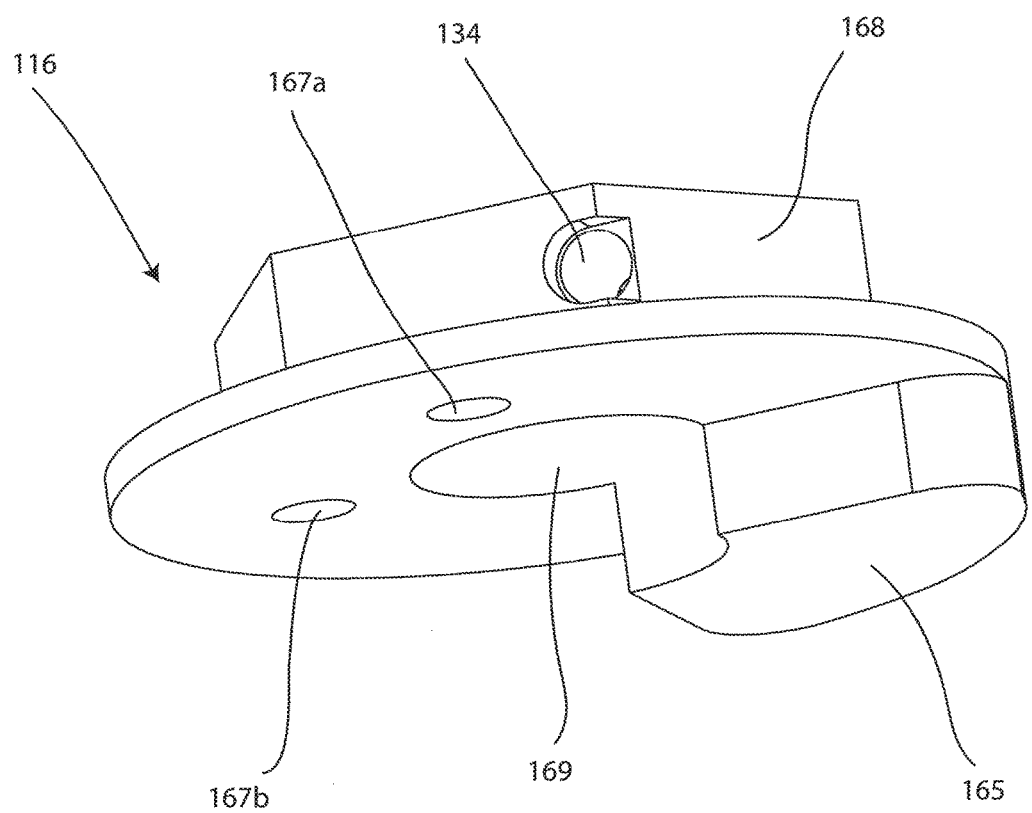
FIG. 15 depicts another perspective view of the actuating component of FIG. 14 in accordance with one embodiment.

As shown, the conduit 126 may include a slot 130 located in an exterior proximate the lower opening 128. The slot 130 may be a channel, notch, passage, conduit, or the like. The slot 130 may be configured to at least partially receive a pin 132 (shown in FIG. 8). The pin 132 may extend through both the slot 130 of the valve 112 and a pin opening 134 found in the actuating component 116. The pin opening 134 may extend through the actuating component 116 and create an opening 136 in an inner circumferential opening of the actuating component 116, as shown in FIG. 15. This opening 136 may allow a portion of the pin 132 to extend through both the actuating component 116 and the slot 130 of the conduit 126 of the valve 112, thereby connecting the actuating component 116 and the valve 112 together such that rotation of the actuating component 116 causes equal rotation of the valve 112. Further, the pin 132 may connect the actuating component 116 to the valve 112, which may further operably connect or attach the actuating component 116 to the upper body 114.

The ball portion 122 of the valve 112 may include a first flat outer surface 138 that may be cut out of the outer ball portion 122. The ball portion 122 may further include a second flat outer surface 140 and a third flat outer surface 142 that may be located on a side of the first flat outer surface 138. The flat surfaces 138, 140, 142 may reduce wear and tear during rotation of the ball portion 122 within the outer body 114. Further, the flat surfaces 138, 140, 142, and particularly the first flat outer surface 138, may facilitate assembly of the oil drain valve 100 by allowing the valve 112 to be inserted into the upper body 114. To assemble the oil drain valve 100, the valve 112 may be oriented such that the first flat outer surface 138 is aligned with the upper opening 118 of the outer body 114. Once the valve 112 is fully inserted into the outer body 114, it may be rotated into an alignment where the opening 120 of the valve 112 is aligned with the upper opening 118 of the outer body 114.

The ball portion 122 may further include a top flat surface 144 that may create a shelf upon which a top cap 146 may be located. The top cap 146 may be attached with an inner sealing o-ring 148. The o-ring 148 may seal the top cap 146 and prevent unwanted debris, oil or other fluid from entering the oil drain valve 100. The top cap 146 may be fashioned with a slot or radius about its thickness to receive the o-ring 148. The upper body 114 may include a circumferential edge 150 within which the top cap 146 rests.

Figure 10:
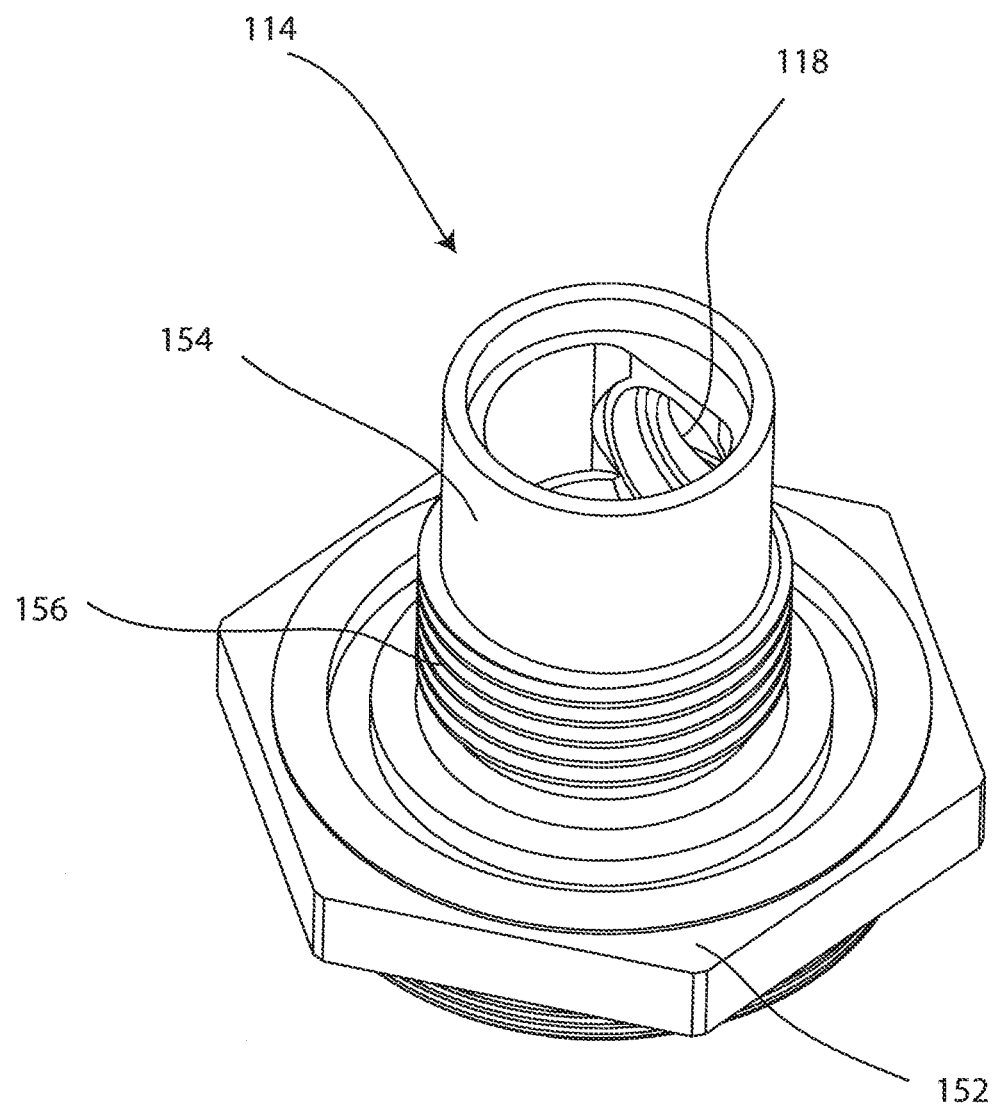
FIG. 10 depicts a perspective view of a body of the oil drain valve of FIGS. 8-9 in accordance with one embodiment.
Figure 11:
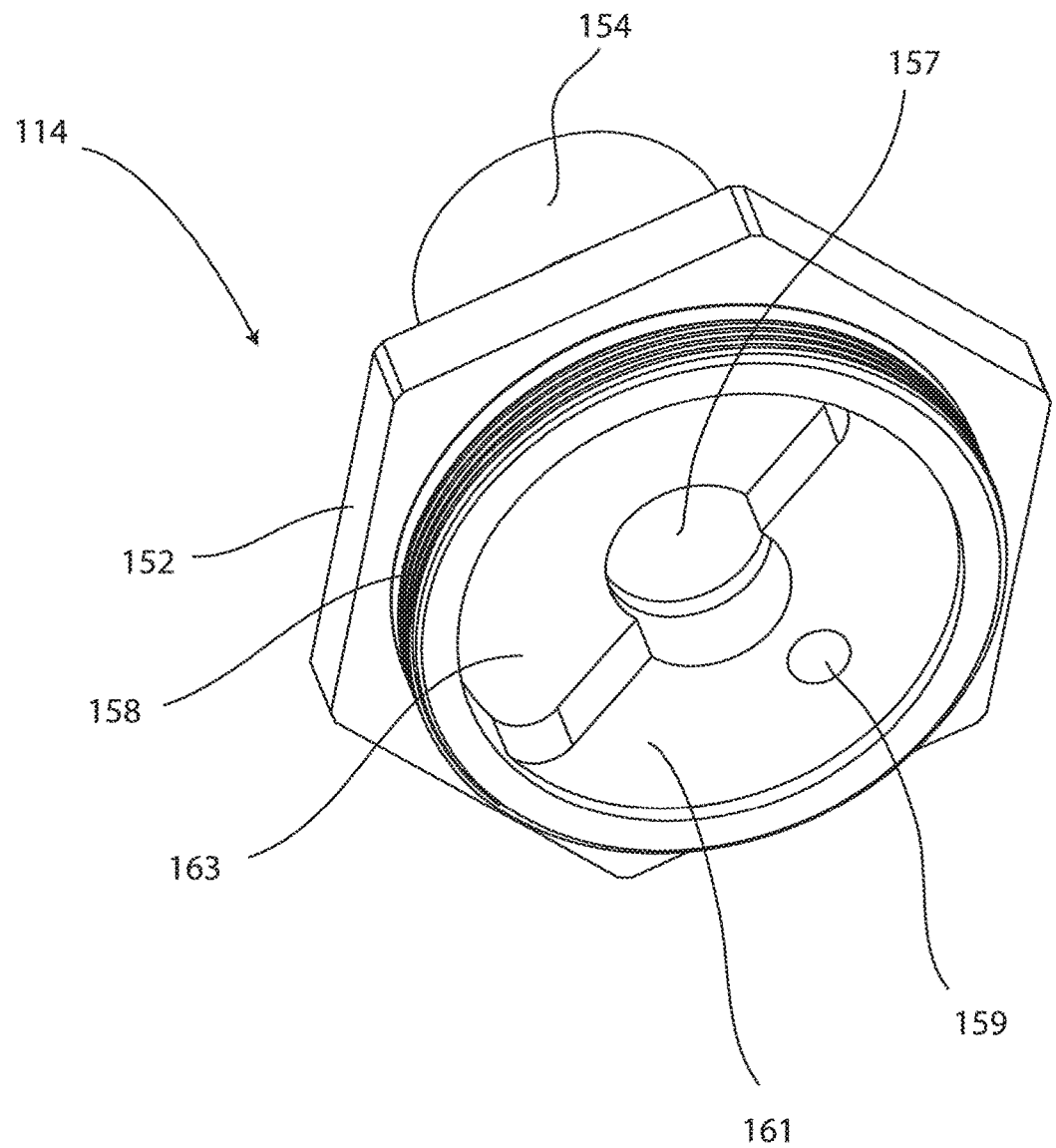
FIG. 11 depicts another perspective view of the body of FIG. 10 in accordance with one embodiment.

Referring now to FIGS. 10 and 11, two perspective views of the upper body 114 is shown. The upper body 114 includes a hexagonal base portion 152 upon which a cylindrical portion 154 extends vertically. The cylindrical portion 154 includes a threaded portion 156 proximate the hexagonal base portion 152. The threaded portion 156 may be configured to interface with a threaded portion of an oil pan of a vehicle (not shown). Proximate the top of the cylindrical portion 154 is an upper opening 118 which receives oil (or other fluid) to drain through the oil drain valve 100.

Figure 16:
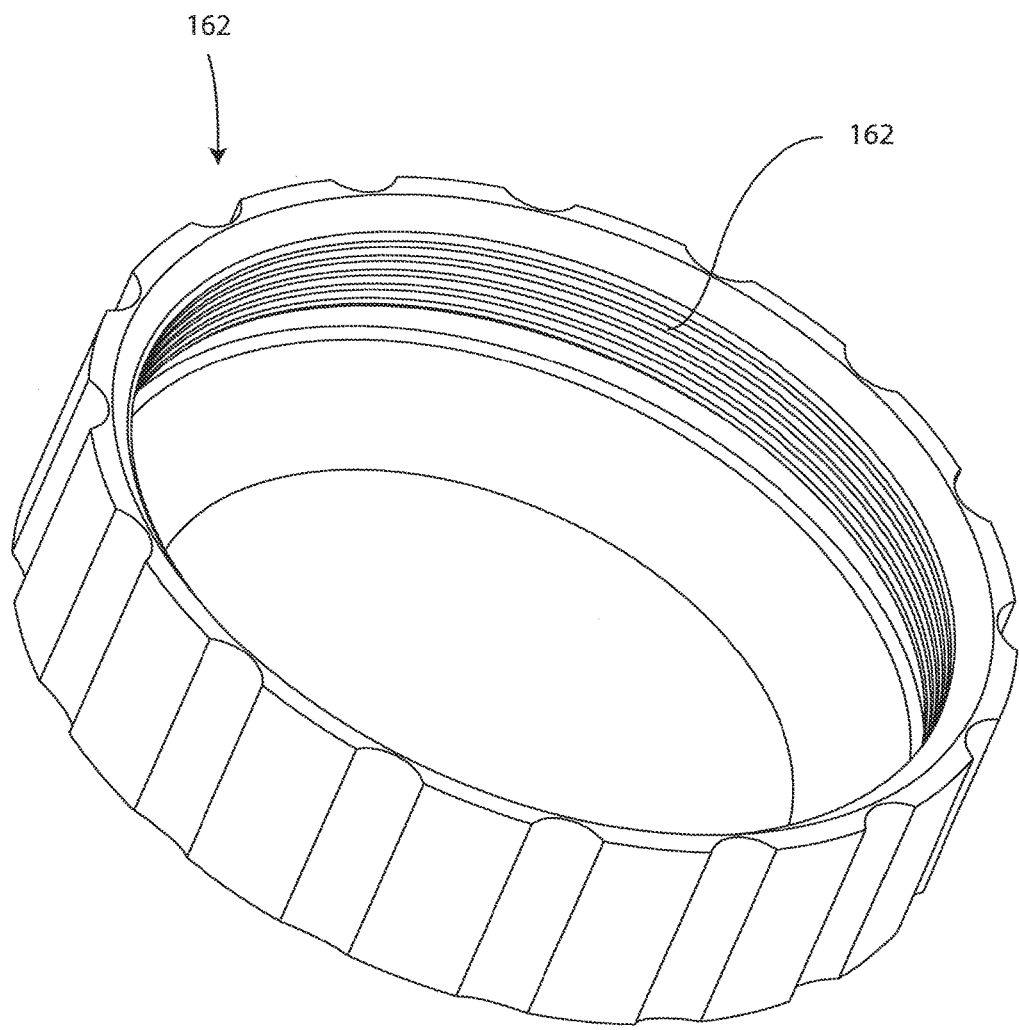
FIG. 16 depicts a perspective view of a protective debris cap of the oil drain valve of FIGS. 8-9 in accordance with one embodiment.

The bottom of the upper body 114 is shown in FIG. 11. Extending below the hexagonal base portion 152 may be a second threaded portion 158. The second threaded portion 158 may be configured to receive a protective debris cap 160, as shown in FIG. 16. Attachable to the second threaded portion 158 of the upper body 114 may be the protective debris cap 160 that includes an inner threaded portion 162 which threadably engages with the outer threads of the second threaded portion 158 located at the lower end of the upper body 114.

Referring back to FIG. 11, the bottom of the upper body 114 includes a channel 157 for receiving the conduit 126 of the valve 112. The channel 157 may be a conduit, bore, or other opening that extends through the upper body 114 to the top of the upper body 114. As shown in FIG. 10, the top of the upper body may have a widened portion of the channel 157 for receiving the ball portion 122 of the valve 112.

Figure 14:
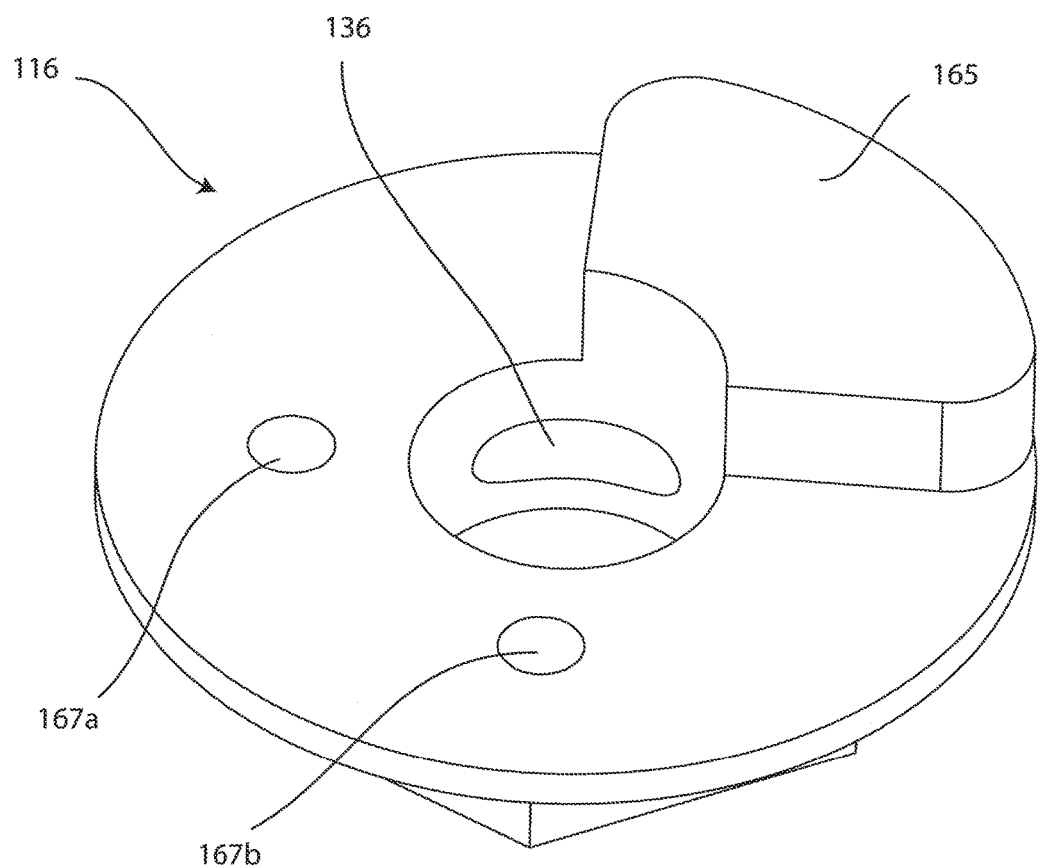
FIG. 14 depicts a perspective view of an actuating component of the oil drain valve of FIGS. 8-9 in accordance with one embodiment.

The bottom of the upper body 114 includes a plateaued portion 161, along with a removed portion 163, from which material has been removed during the machining of the upper body 114. Referring now to FIGS. 14-15, the removed portion 163 may be configured to receive a plateaued portion 165 of the actuating component 116 such that the actuating component 116 may rotate about the upper body 114 with at a certain degree of rotation defined by the size of the removed portion 163 and the plateaued portion 165. In the embodiment shown 163, the plateaued portion 165 encompasses about 90 degrees of the circumferential dimension of the actuating component 116, while the removed portion 163 encompasses about 180 degrees of the circumferential dimension of the upper body 114. In this configuration, the amount of rotation between the upper body 114 and the actuating component 116 may be approximately 90 degrees. Other embodiments are contemplated, however.

The plateaued portion 161 may include a vertical spring opening 159 within which a ball 164 and a spring 166 may reside (shown in FIG. 9). As shown in FIGS. 14-15, the actuating component 116 may include a first recess 167a or detent and a second recess 167b or detent. The first and second recesses 167a, 167b may be configured to hold the actuating component 116 in a first position and a second position (the two extreme positions, each separated by 90 degrees of rotation). It should be understood that the first and the second positions correspond to an open and closed valve position. Thus, in the first position, the spring 166 may be configured to push the ball 164 into the first recess 167a. Then, when the actuating component 116 is rotated into the second position, the spring 166 may be configured to push the ball 164 into the second recess 167b. The first and second recesses 167a, 167b may be dimensioned such that a reasonable amount of hand-applied force may overcome the holding force created by the spring 166 and ball 164. The ball 164 may be configured to partially enter into the first recess 167a to retain the valve 112 in a closed position, for example, such that the spring 166 exerts pressure on the ball 164. The ball 164 may further be configured to partially enter into the second recess 167b to retain the valve 112 in an open position in the same manner.

The actuating component 116 may include a hexagonal portion 168 that may be exposed when the protective debris cap 160 is removed. The hexagonal portion 168 may allow for a user or operator to rotate, by hand or with a simple hand tool, the hexagonal portion of the actuating component 116 about the upper body 114, thereby rotating the valve 112 about the upper body 114 in the first and second rotation directions D1, D2. The actuating component 116 further includes a nut opening 169 in the center of the actuating component 116 that aligns with the channel 157 or lower opening of the upper body 114 and allows the conduit 126 of the valve 112 to be inserted therein.

Referring back to FIG. 9, the oil drain valve 100 may include a plurality of sealing rings 170, 172, 174. For example, a sealing ring 172 may be located at a bottom of the hexagonal portion 152 of the upper body 114 and may seal the oil drain valve 100 at a location where the oil drain valve 100 interfaces with the oil pan or other vehicle or system interface. Another sealing ring 170 may be configured to seal the protective debris cap 160 with the upper body 114. Still another sealing ring 174 may be located within the opening 118 for sealing this opening 118 to the upper ball portion 122 of the valve 112. A plastic ring 176 may further be located within the opening 118 of the upper body 114.

In other embodiments, a method of draining fluid, such as oil, from a system, such as a vehicle, includes providing a drain valve, such as the oil drain valve 100, having a body, such as the body 110, and a valve, such as the valve 112, rotating the valve about the body in a first direction to open the drain valve, receiving oil through the opened oil drain valve, releasing oil through a conduit, such as the conduit 126, at a bottom of the oil drain valve; and rotating the valve about the body in a second direction to close the drain valve.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, it should be understood that the present invention may include any combination of the components, hierarchy and methodology described herein.

What is claimed is:

1. A drain valve comprising:
   a body having an upper opening;
   a ball valve located in the body having a valve opening that is alignable with the upper opening when the ball valve is in an open state, the ball valve configured to release oil that enters the ball valve through the upper opening when the ball valve is in an open state;
   a conduit extending from the ball valve configured to receive released oil from the ball valve, the conduit having an external slot; and
   an actuating component having a pin opening, the actuating component attached to the conduit with a pin extending through the external slot of the conduit and the pin opening of the actuating component;
   wherein the ball valve is rotatable with respect to the body in a first rotational direction to move the ball valve from the open state to a closed state, and wherein the ball valve is rotatable with respect to the body in a second rotational direction opposite from the first rotational direction to move the ball valve from the closed state to the open state, wherein the actuating component rotates with the ball valve about the body in the first and second rotational directions.

2. The drain valve of claim 1, wherein the upper body includes the upper opening and a lower opening, and wherein the actuating component includes an opening aligned with the lower opening.

3. The drain valve of claim 1, wherein the conduit includes a lower opening, and wherein the oil is released from the ball valve through the lower opening of the conduit.

4. The drain valve of claim 1, wherein the ball valve includes at least one flat outer surface.

5. The drain valve of claim 4, wherein the ball valve includes three flat outer surfaces.

6. The drain valve of claim 2, wherein the upper body includes a spring opening that houses a spring and a ball.

7. The drain valve of claim 6, wherein the actuating component includes a first recess and a second recess, wherein the spring exerts pressure on the ball such that the ball is configured to partially enter into the first recess to retain the ball valve in a closed position, wherein the spring exerts pressure on the ball such that the ball is configured to partially enter into the second recess to retain the valve in an open position.

8. A drain valve comprising:

a body;

a ball valve having a first valve opening that is exposed to an external environment through the body, the ball valve including a drain opening for releasing oil through a second valve opening;

a conduit extending from the second opening of the ball valve, the conduit having an external slot;

an actuating component having a pin opening, the actuating component attached to the conduit with a pin extending through the external slot of the conduit and the pin opening of the actuating component;

wherein the body is rotatable with respect to the ball valve in a first rotational direction to move the ball valve from the open state to a closed state with respect to the body, wherein the actuating component rotates with the ball valve and the conduit.

9. The drain valve of claim 8, wherein the body includes an upper opening and a lower opening, and wherein the actuating component includes an opening aligned with the lower opening.

10. The drain valve of claim 8, wherein the conduit includes the second valve opening, and wherein the oil is released from the ball valve through the second valve opening.

11. The drain valve of claim 8, wherein the ball valve includes at least one flat outer surface.

12. The drain valve of claim 11, wherein the ball valve includes three flat outer surfaces.

13. The drain valve of claim 9, wherein the upper body includes a spring opening that houses a spring and a ball.

14. The drain valve of claim 13, wherein the actuating component includes a first recess and a second recess, wherein the spring exerts pressure on the ball such that the ball is configured to partially enter into the first recess to retain the ball valve in a closed position, wherein the spring exerts pressure on the ball such that the ball is configured to partially enter into the second recess to retain the ball valve in an open position.

* * * * *